US008538656B2

(12) United States Patent
Yamashiro (10) Patent No.: US 8,538,656 B2
(45) Date of Patent: Sep. 17, 2013

(54) TRACKING RUNNING CONTROL APPARATUS

(75) Inventor: Takahisa Yamashiro, Chiryu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/546,109

(22) Filed: Jul. 11, 2012

(65) Prior Publication Data

US 2013/0024084 A1    Jan. 24, 2013

(30) Foreign Application Priority Data

Jul. 23, 2011    (JP) .................. 2011-161456

(51) Int. Cl.
*B60T 7/12* (2006.01)
*G01S 13/00* (2006.01)
*H04N 7/18* (2006.01)

(52) U.S. Cl.
USPC .................. 701/96; 342/70; 348/67

(58) Field of Classification Search
USPC .................. 701/23, 41, 60, 58, 65, 72, 79, 80, 701/82, 121, 117, 110, 96, 29.2, 29.9, 31.9, 701/32.4, 32.5, 400–541; 342/46, 51–57, 342/70–72, 173, 455, 458, 461, 463, 357.2–357.39; 348/67, 94, 113, 119, 135, 142, 148–149
See application file for complete search history.

(56) References Cited

U.S. PATENT DOCUMENTS

| | | | | |
|---|---|---|---|---|
| 2008/0078600 A1* | 4/2008 | Inoue et al. | ................... | 180/170 |
| 2011/0080312 A1* | 4/2011 | Oh et al. | ......................... | 342/70 |

FOREIGN PATENT DOCUMENTS

| | | | |
|---|---|---|---|
| JP | 2000-348300 | | 12/2000 |
| JP | 2002-032899 | | 1/2002 |
| JP | 2003-217074 | * | 7/2003 |
| JP | 2007-003287 | | 1/2007 |

* cited by examiner

*Primary Examiner* — Muhammad Shafi
(74) *Attorney, Agent, or Firm* — Harness, Dickey & Pierce, PLC (57) ABSTRACT

A tracking running control apparatus determines a failure-predicted segment where distance measurement using a laser radar is predicted to undergo a failure. Upon reaching the failure-predicted segment, a distance measurement device used in tracking running control is changed from the distance measurement device using the laser radar to a distance measurement device using a GPS receiver. Before the change of the distance measurement devices, a target inter-vehicle distance is gradually changed to a GPS-utilized target inter-vehicle distance through changing a vehicle speed with an acceleration equal to or less than a predetermined value. Under the configuration, it is possible to suppress annoyance for a driver of the vehicle because of the change of the target inter-vehicle distances accompanying the change of the distance measurement devices.

10 Claims, 8 Drawing Sheets

TRACKING RUNNING CONTROL APPARATUS

CROSS REFERENCE TO RELATED APPLICATION

This application is based on Japanese Patent Application No. 2011-161456 filed on Jul. 23, 2011, the disclosure of which is incorporated herein by reference.

TECHNICAL FIELD

The present disclosure relates to a tracking running control apparatus for tracking running to track a preceding vehicle, and more particularly, for vehicles-convoy running in which a convoy of vehicles performs successive tracking running.

BACKGROUND

[Patent document 1] JP 2000-348300 A
[Patent document 2] JP 2003-217074 A

To perform vehicles-convoy running, an apparatus for tracking running with the second and the subsequent vehicles with respect to a preceding vehicle has been proposed (e.g., see Patent documents 1 and 2). Patent document 1 discloses obtaining, from a different vehicle, tracking running data such as positional information, measured in the different vehicle of a vehicles convoy using a GPS apparatus, via inter-vehicle communication. Further, Patent document 1 discloses detecting a preceding vehicle with a laser radar and correcting the above-described tracking running data based on the result of detection. Further, Patent document 2 discloses using a wide area or local area radio communication device so as to deal with a trouble in the inter-vehicle communication device, via which data communication is made among respective vehicles of a vehicles convoy.

In Patent document 1, the result of detection using the laser radar is used in correction of the positional information measured with the GPS apparatus. When the GPS apparatus, in addition to the laser radar, is provided, it is possible to have plural distance measurement devices using these apparatuses respectively for measuring the distance with respect to a preceding vehicle. Accordingly, it is possible to select one of these distance measurement devices. That is, when it is impossible for one of these distance measurement devices to measure the distance to the preceding vehicle, the current distance measurement device can be replaced with the other distance measurement device.

For example, in the laser radar, as a detection angular range to detect the preceding vehicle is limited to a comparatively narrow angular range in a vehicle front position, there is a probability that it cannot detect the preceding vehicle at a tight curve in the road or the like. When the current detection device using the laser radar is replaced with the device to detect the distance to the preceding vehicle based on the position measured with the GPS apparatus, it is possible to reduce the time in which the result of measurement of distance to the preceding vehicle cannot be obtained to a great extent.

However, when the distance measurement device is selected, the following occurs. No matter what the measuring method is, the distance measurement device has a measurement error. Accordingly, when tracking running with respect to a preceding vehicle is performed, it is preferable to set a target inter-vehicle distance between the vehicle and the preceding vehicle in consideration of such measurement error. Further, the measurement error differs by type of distance measurement device. Accordingly, it is preferable that the target inter-vehicle distance differs in accordance with type of distance measurement device. When a long target inter-vehicle distance is set, as the influence of the measurement error on the target inter-vehicle distance is small, it is not always necessary to set the target inter-vehicle distance in accordance with type of distance measurement device. However, in the case of vehicles-convoy running, as the target inter-vehicle distance is often short, the measurement difference has a significant influence on the target inter-vehicle distance. Accordingly, it is necessary to set the target inter-vehicle distance in accordance with type of distance measurement device.

However, when the target inter-vehicle distance is immediately changed to a target inter-vehicle distance corresponding to the replaced distance measurement device, the speed radically changes in accordance with the radical change of the target inter-vehicle distance. This radical speed change may annoy the driver.

SUMMARY

The present disclosure has been made in view of the above situation. It is an object of the present disclosure to provide a tracking running control apparatus capable of suppressing annoyance for a driver.

To achieve the above object, according to an example of the present disclosure, a tracking running control apparatus in a vehicle is provided as follows. The apparatus has a plurality of distance measurement devices using mutually different modes, respectively, to sequentially measure an inter-vehicle distance that is a distance to a preceding vehicle. The tracking running control apparatus performs a tracking running control with respect to the preceding vehicle so as to set the inter-vehicle distance to a target inter-vehicle distance that is associated with each of the distance measurement devices. The apparatus includes a radio receiver, a failure prediction section, a target inter-vehicle distance change section, and a distance measurement device change section. The radio receiver receives failure information of a different vehicle that is different from the vehicle via an outside source outside of the vehicle, the failure information of the different vehicle containing (i) failure device information to specify a distance measurement device that underwent a measurement failure in a measurement of an inter-vehicle distance and (ii) failure point information to determine a failure point at which the measurement failure was undergone. The failure prediction section obtains (i) failure-predicted device information indicating a failure-predicted distance measurement device that is predicted to undergo a measurement failure in a measurement of an inter-vehicle distance and (ii) a failure-predicted segment in which the measurement failure is predicted, based on the failure information of the different vehicle received by the radio receiver. In cases that a used distance measurement device that is used in the tracking running control of the vehicle is the failure-predicted distance measurement device indicated by the failure-predicted device information, the target inter-vehicle distance change section determines to change the used distance measurement device from the failure-predicted distance measurement device indicated by the failure-predicted device information to a different distance measurement device other than the failure-predicted distance measurement device, and changes gradually the target inter-vehicle distance set in the tracking running control to a changed target inter-vehicle distance that is associated with the different distance measurement device at an acceleration equal to or less than a predetermined value before the vehicle reaches the failure-predicted segment. When an inter-vehicle distance to a preceding vehicle becomes the changed target inter-vehicle distance, the distance measurement device change section changes the used distance measurement device from the failure-predicted distance measurement device to the different distance measurement device.

In this manner, in the present example, before a vehicle arrives at a failure-predicted segment, as a distance measurement device used in tracking running control, a distance measurement device indicated with the failure prediction information is changed to another different distance measurement device. Accordingly, even when the vehicle enters the failure-predicted segment, it is possible to suppress the inconvenience of unsuccessful tracking running with respect to a preceding vehicle due to failure of measurement of the distance to the preceding vehicle.

Further, the change of the distance measurement device is performed when the target inter-vehicle distance has been changed to a target inter-vehicle distance associated with or corresponding to the changed distance measurement device after the change. Further, the target inter-vehicle distance upon tracking running is gradually changed at a previously-set accelerated speed or lower speed to the target inter-vehicle distance corresponding to the changed distance measurement device. Accordingly, it is possible to suppress annoyance for the driver by changing the target inter-vehicle distance accompanying the change of the distance measurement devices.

According to another example of the present disclosure, a tracking running control apparatus in a vehicle is provided as follows. The apparatus has a first distance measurement device and a second distance measurement device to sequentially measure an inter-vehicle distance that is a distance to a preceding vehicle. The first distance measurement device measures the inter-vehicle distance from a time period between transmission of a transmission radio wave and reception of a reflection wave of the transmission radio wave. The second distance measurement device measures the inter-vehicle distance from a distance between a position of the vehicle and a position of the preceding vehicle detected with a global positioning system. The tracking running control apparatus performs a tracking running control with respect to the preceding vehicle so as to set the inter-vehicle distance to a target inter-vehicle distance that is associated with each of the first distance measurement device and the second distance measurement device. The apparatus includes a radio receiver, a failure prediction section, a target inter-vehicle distance change section, and a distance measurement device change section. The radio receiver receives failure information of a different vehicle that is different from the vehicle via an outside source outside of the vehicle, the failure information of the different vehicle containing failure point information to determine a failure point at which a measurement failure in a measurement of an inter-vehicle distance was undergone. The failure prediction section to determine a failure-predicted segment in which the failure of the distance measurement is predicted based on the failure information received by the radio receiver. The failure prediction section obtains a failure-predicted segment in which a measurement failure in a measurement of an inter-vehicle distance is predicted, based on the failure information of the different vehicle received by the radio receiver. The target inter-vehicle distance change section determines to change a used distance measurement device that is used in the tracking running control of the vehicle to the second distance measurement device in cases that the radio receiver receives the failure information of the different vehicle, and changes gradually the target inter-vehicle distance set in the tracking running control to a changed target inter-vehicle distance that is associated with the second distance measurement device at an acceleration equal to or less than a predetermined value before the vehicle reaches the failure-predicted segment. The distance measurement device change section changes to the second distance measurement device after an inter-vehicle distance to a preceding vehicle becomes the changed target inter-vehicle distance.

In this manner, in the present example, before a vehicle arrives at a failure-predicted segment, a distance measurement device used in tracking running control is changed from the first distance measurement device to the second distance measurement device. Accordingly, even when the vehicle enters the failure-predicted segment, it is possible to prevent the vehicle from failing in tracking a preceding vehicle because of the failure in the distance measurement.

Further, the change of the distance measurement devices is performed when the target inter-vehicle distance has been changed to a target inter-vehicle distance associated with or corresponding to the second distance measurement device. Further, the target inter-vehicle distance upon tracking running is gradually changed at a previously-set accelerated speed or lower speed to the target inter-vehicle distance corresponding to the second distance measurement device. Accordingly, it is possible to suppress annoyance for the driver by changing the target inter-vehicle distance accompanying the change of the distance measurement devices.

BRIEF DESCRIPTION OF THE DRAWINGS

The above and other objects, features, and advantages of the present disclosure will become more apparent from the following detailed description made with reference to the accompanying drawings. In the drawings.

DETAILED DESCRIPTION

Figure 1:
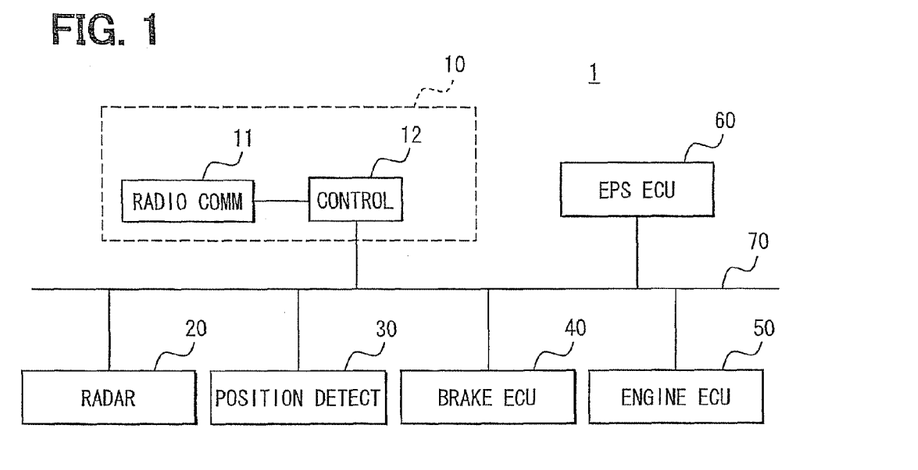
FIG. 1 is a block diagram schematically showing a configuration of an on-vehicle tracking running system including a tracking running control apparatus according to an embodiment of the present disclosure.

Hereinbelow, an embodiment of the present disclosure will be described based on the drawings and is applied to an on-vehicle tracking running system 1. The "tracking running" may be also referred to as "follow-up running." The on-vehicle tracking running system 1 is incorporated in a large number of vehicles, and the vehicles provided with the on-vehicle tracking running systems 1 respectively perform tracking running with respect to a preceding vehicle (vehicle ahead of a subject vehicle), to realize vehicles-convoy running. Further, a "host vehicle" is used to define a vehicle to which a relevant apparatus or device is mounted. FIG. 1 is a block diagram schematically showing a configuration of the on-vehicle tracking running system 1 that is mounted in a subject vehicle or a host vehicle.

As shown in FIG. 1, the on-vehicle tracking running system 1 mounted in the subject vehicle has a tracking running control apparatus 10, a laser radar 20, a position detection unit 30, a brake ECU 40, an engine ECU 50, and an electric power steering (EPS) ECU 60. These units are interconnected via a vehicle LAN 70 compliant with a communication protocol such as CAN (Controller Area Network). An "ECU" signifies an electronic control unit.

The tracking running control apparatus 10 has a radio communication unit 11 and a controller 12. The radio communication unit 11, having a transmission/reception antenna, performs inter-vehicle communication by radio communication within several hundred meters around the subject vehicle or host vehicle as a communication range. The radio communication unit 11 uses a radio wave in e.g. 700 MHz band, however, radio waves in other frequency bands such as 5.9 GHz may be used. Further, as a particular example of inter-vehicle communication, broadcast communication (unidirectional communication) of information on the subject vehicle, reception of information transmitted from a peripheral vehicle and the like are given. The radio communication unit 11 includes a radio transmission unit (i.e., radio transmitter) and a radio reception unit (i.e., a radio receiver).

It is noted that in the present application, "information" may be used as being countable as well as uncountable and be identical to "an information item." Thus, "several informations" may be used and be identical to "several information items."

The controller 12 includes a known CPU, memories such as a ROM, a RAM, and an EEPROM, an I/O, and a bus line connecting these elements (all not shown). The controller 12 controls the brake ECU 40, the engine ECU 50, and the EPS ECU 60 to perform tracking running control based on information(s) obtained from other vehicle(s) via the radio communication unit 11 and information obtained from the laser radar 20, the position detection unit 30, the brake ECU 40, the engine ECU 50, and the EPS ECU 60 via the vehicle LAN 70. Further, the controller 12 transmits vehicles-convoy running information, as information of the subject vehicle to be utilized with other vehicles in the vehicles convoy in vehicles-convoy running control, from the radio communication unit 11. Note that the details of the processing by the controller 12 will be described later.

The laser radar 20 is provided at a front end of the vehicle. The laser radar 20 detects an object ahead of the vehicle by scanning laser light in a predetermined angular range ahead of the vehicle and receiving reflection light of the laser light. Upon detection of object ahead of the vehicle, the existence of the object is detected based on the intensity of reflection light equal to or higher than a predetermined level. Further, the laser radar 20 detects a relative direction of the object ahead of the vehicle from the transmission direction of the laser, and measures the distance to the object ahead of the vehicle based on a time period from the transmission of the laser light to the reception of the laser light. Further, the laser radar 20 determines whether or not the object ahead of the vehicle is a preceding vehicle (vehicle running ahead of the vehicle). Accordingly, the laser radar 20 sequentially measures a distance (i.e., an inter-vehicle distance) to the preceding vehicle.

The laser radar 20 may be referred to as a first distance measurement device using a first mode (i.e., a mode using the laser radar). Note that a milliwave radar may be used in place of the laser radar 20. Further, the controller 12 may determine whether or not the object ahead of the vehicle.

The position detection unit 30 has a GPS (Global Positioning System) reception unit to receive a radio wave from a GPS satellite. The position detection unit 30 sequentially detects a coordinate (latitude and longitude) indicating the current position of the subject vehicle based on the radio wave received with the GPS reception unit. The position detection unit 30 forms, together with the controller 12 and the radio communication unit 11, a second distance measurement device using a second mode (i.e., a mode using the GPS). The controller 12 calculates the distance to the preceding vehicle, based on a distance between the current position of the subject vehicle detected with the position detection unit 30 and the current position of the preceding vehicle received with the radio communication unit 11. Note that the GPS reception unit is provided in an approximately central position of the vehicle. The distance calculated using the GPS reception unit is a distance between the position in the vehicle in which the GPS reception unit is provided and a position in the preceding vehicle in which the GPS reception unit is provided. Further, the controller 12 holds a distance from an end of the vehicle to the position in which the GPS reception unit is provided.

The brake ECU 40 has a microcomputer including a CPU, a ROM, a RAM, a backup RAM and the like as a main body. The brake ECU 40 obtains signals indicating a vehicle speed, longitudinal acceleration and lateral acceleration from e.g. a vehicle speed sensor and an acceleration sensor, and provides the signals to the controller 12. Further, the brake ECU 40 controls a brake actuator based on an instruction from the controller 12, to slow down the vehicle.

The engine ECU 50 controls engine torque caused in the engine (not shown) so as to accelerate/decelerate the vehicle speed based on an instruction from the controller 12. The EPS ECU 60 obtains signals indicating steering torque and a steering angle from a torque sensor and a steering angle sensor, and provides the signals to the controller 12. Further, the EPS ECU 60 controls a motor to rotate the steering shaft based on an instruction from the controller 12.

Figure 2:
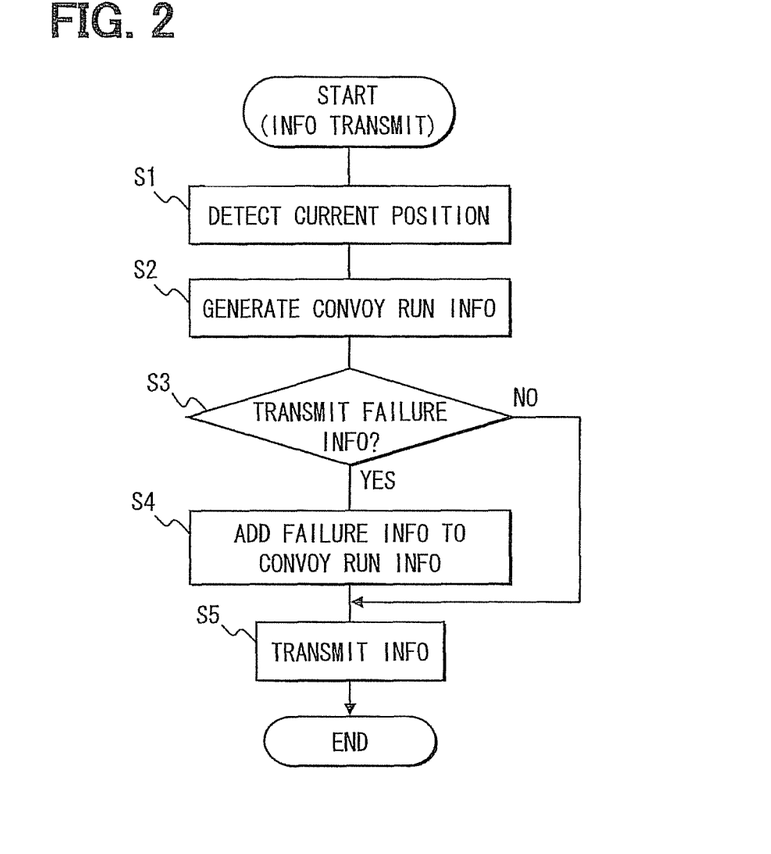
FIG. 2 is a flowchart showing information transmission processing performed by a controller.

Next, the processing by the controller 12 will be described in detail. FIG. 2 is a flowchart showing information transmission processing performed by the controller 12. This is processing to transmission of the above-described vehicles-convoy running information to other vehicles performed at predetermined periods during vehicles-convoy running.

It is noted that a flowchart or the processing of the flowchart in the present application includes sections (also referred to as steps), each of which is represented, for instance, as S1. Further, each section can be divided into several sub-sections while several sections can be combined into a single section. Furthermore, each of thus configured sections can be also referred to as a device, module, or means.

Each or any combination of sections explained in the above can be achieved as (i) a software section in combination with a hardware unit (e.g., computer) or (ii) a hardware section, including or not including a function of a related apparatus; furthermore, the hardware section may be constructed inside of a microcomputer.

First, at S1, the current position of the subject vehicle is detected with the position detection unit 30. Next at S2, the above-described vehicles-convoy running information is generated. The vehicles-convoy running information includes the current position of the subject vehicle detected at S1, further, includes the traveling direction of the subject vehicle determined from time-based change of the current position. Further, the vehicles-convoy running information may include time corresponding to the current position and the ID of the subject vehicle. The processing at S2 corresponds to an order determination information generation section, device, or means.

Next, at S3, it is determined whether or not it is necessary to transmit failure information. The failure information includes information to specify a distance measurement device which has failed (i.e., has undergone a failure) in measurement of a distance to a preceding vehicle and failure point information to determine a failure point at which the distance measurement has failed (i.e., has undergone a failure). It is determined that it is necessary to transmit failure information when failure information is generated in GPS tracking running control to be described later (FIG. 4) and the failure information is not transmitted yet. When this determination is affirmative, the process proceeds to S4, at which the failure information is added to the vehicles-convoy running information. Then process proceeds to S5. On the other hand, when the determination at S3 is negative, the process directly proceeds to S5. At S5, the vehicles-convoy running information is broadcast-transmitted from the radio communication unit 11.

Figure 3:
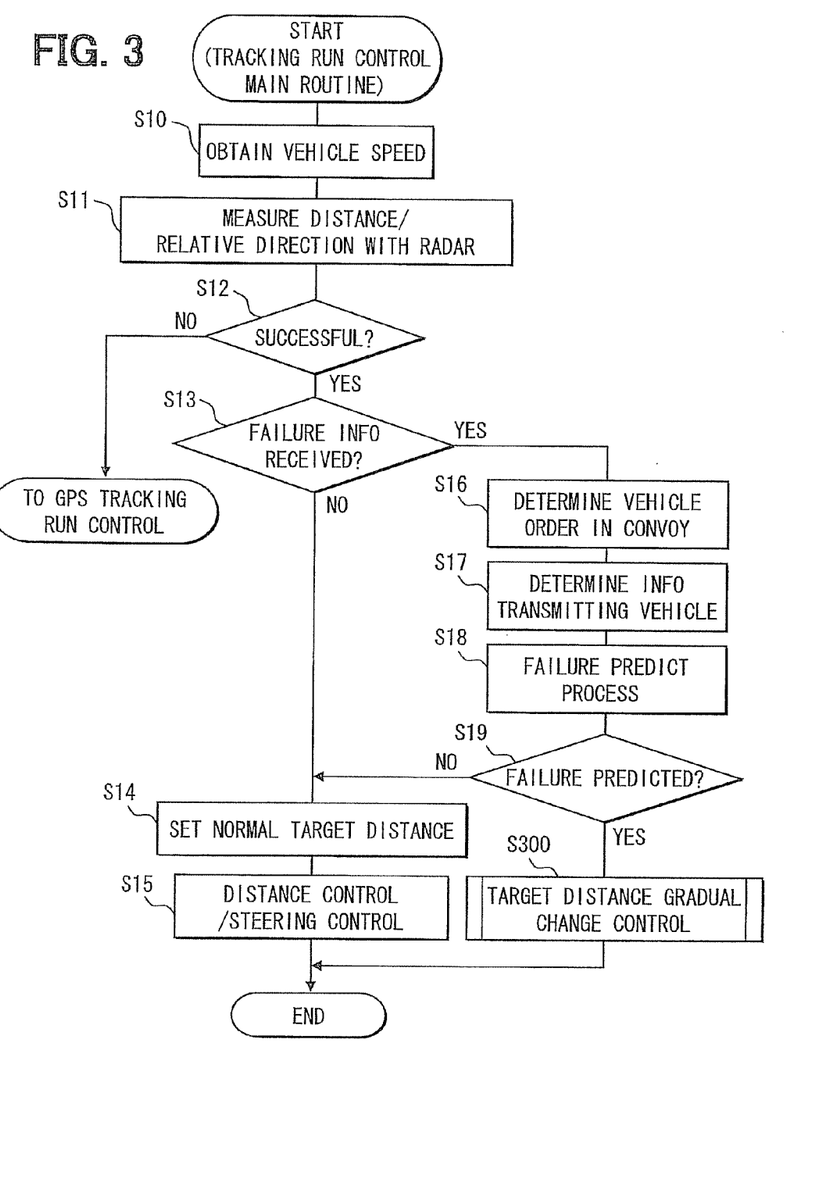
FIG. 3 is a flowchart showing a main routine of tracking running control.

Next, the tracking running control performed by the controller 12 will be described. FIG. 3 is a flowchart showing a main routine of the tracking running control. Note that the processing shown in FIG. 3 is also performed during the vehicles-convoy running.

At S10, the vehicle speed is obtained. Next, at S11, the distance to the preceding vehicle and the relative direction of the preceding vehicle with respect to the subject vehicle are measured using the laser radar 20. Next, at S12, it is determined whether or not the distance measurement has been successful. When the preceding vehicle has not been detected, the determination is negative. When the determination is negative, as the distance measurement using the laser radar 20 is impossible, the GPS tracking running control (FIG. 4) is performed.

On the other hand, when the determination at S12 is affirmative, then it is determined at S13 whether or not the failure information has been received from another vehicle. Note that in the above-described information transmission processing in FIG. 2, when the other vehicle has transmitted the vehicles-convoy running information including the failure information and the radio communication unit 11 of the subject vehicle has received the vehicles-convoy running information, the determination at S13 is affirmative.

When the determination at S13 is negative, the process proceeds to S14, at which a normal target inter-vehicle distance is set. The normal target inter-vehicle distance is a target inter-vehicle distance that is determined in consideration of the vehicle speed obtained at S10 and the type (i.e., the laser radar 20) and the distance measurement accuracy of the distance measurement device; further, with respect to the normal target inter-vehicle distance, the target inter-vehicle distance gradual change control is not performed. Note that the normal target inter-vehicle distance is prolonged in accordance with increment in the vehicle speed, and is prolonged in accordance with degradation of the distance measurement accuracy. Note that in the present embodiment, the distance measurement accuracy of the laser radar 20 is a constant value, and the normal target inter-vehicle distance is set by using the relation that the normal target inter-vehicle distance is prolonged in accordance with increment in the vehicle speed.

Next, at S15, using the result of measurement at S11 and the normal target inter-vehicle distance set at S14, instructions are outputted to the brake ECU 40, the engine ECU 50, and the EPS ECU 60 so as to perform tracking with the normal target inter-vehicle distance with respect to the preceding vehicle.

When the determination at S13 is affirmative, the process proceeds to S16, at which the order of the subject vehicle from the head in the vehicles convoy is determined. The order in the vehicles convoy is determined as follows. That is, from the current position and the traveling direction of another vehicle included in the vehicles-convoy running information sequentially transmitted from the other vehicle in the vehicles convoy and sequentially received with the radio communication unit 11 of the subject vehicle, the running locus of the other vehicle is calculated. Then the running locus of the other vehicle and the running locus of the subject vehicle are compared with each other, so as to determine whether or not the other vehicle and the subject vehicle belong to the same vehicles convoy and determine the positional relation between the other vehicle and the subject vehicle. Further, when the time and ID are included in the vehicles-convoy running information transmitted from the other vehicle, the running locus of the other vehicle and positions at respective time points are determined using the time and the ID. Then, the positional relations between the subject vehicle and all the other vehicles in the vehicles convoy are determined so as to determine the order of the subject vehicle in the vehicles convoy. The processing at S13 corresponds to an order-in-convoy determination section, device, or means.

Next, at S17, based on the positional relation determined at S16, it is determined whether or not the vehicle as a transmitter of the failure information received with the subject vehicle is ahead of the subject vehicle in the vehicles convoy. This processing corresponds to an information transmitting vehicle determination section, device, or means.

Next, at S18, failure prediction processing is performed. The failure prediction processing is processing to determine failure-predicted device information and a failure-predicted segment. Further, the failure-predicted device information indicates a distance measurement device predicted to fail in the measurement of the distance to the preceding vehicle. The failure-predicted segment is a segment in which the distance measurement with the distance measurement device indicated with the failure-predicted device information is predicted to fail. In the present embodiment, the failure-predicted device information and the failure-predicted segment are not necessarily generated even when the failure information has been received from another vehicle. When it is determined that there is a high probability of failure in the distance measurement in the subject vehicle, the failure-predicted device information and the failure-predicted segment are generated.

The determination as to whether or not the probability of the failure in the distance measurement is high is made from the percentage or ratio of measurement-failed vehicles ahead of the subject vehicle in the vehicles convoy. That is, the number of vehicles ahead of the subject vehicle in the vehicles convoy, from which the failure information has been received, is determined. The determination is made based on the determination results at S16 to S18. For example, when the subject vehicle is the 11th vehicle in the vehicles convoy, and it has received the failure information from seven vehicles of ten vehicles ahead of the subject vehicle in the vehicles convoy, the above-described percentage is 70%. Note that the calculation of the percentage is not performed with the failure segment itself included in the failure information as a unit but a smallest segment using the failure segments in all the received failure informations as a unit. For example, assuming that a failure segment in some failure information is points A-B-C, and another failure segment in other failure information is points B-C-D, each of "points A-B," "points B-C," and "points C-D" is regarded as a single one segment.

The above-described percentage calculated with the above-described segment as a unit and a previously-set reference percentage are compared with each other, and when the calculated percentage is equal to or higher than the reference percentage, it is determined that the probability of the failure in the distance measurement in the subject vehicle is high. Then the segment in which the percentage has been calculated is determined as a failure-predicted segment. The distance measurement device indicated with the failure information used in the percentage calculation is determined as failure-predicted device information.

On the other hand, when the above-described percentage is lower than the reference percentage, even when the failure information has been received from a part of the preceding vehicles, the determination of failure-predicted segment and failure-predicted device information is not performed. Note that when the design change to set the above-described reference percentage to 0 is possible. That is, when the failure information has been received from at least one preceding vehicle, a failure-predicted segment and failure-predicted device information are determined.

Next, at S19, it is determined whether or not failure has been predicted in the failure prediction processing at S18, i.e., whether or not failure-predicted device information and a failure-predicted segment have been determined. When the determination is negative, the above-described S14 and S15 are performed. On the other hand, when the determination at S19 is affirmative, the process proceeds to S300, at which the target inter-vehicle distance gradual change control is performed.

Figure 4:
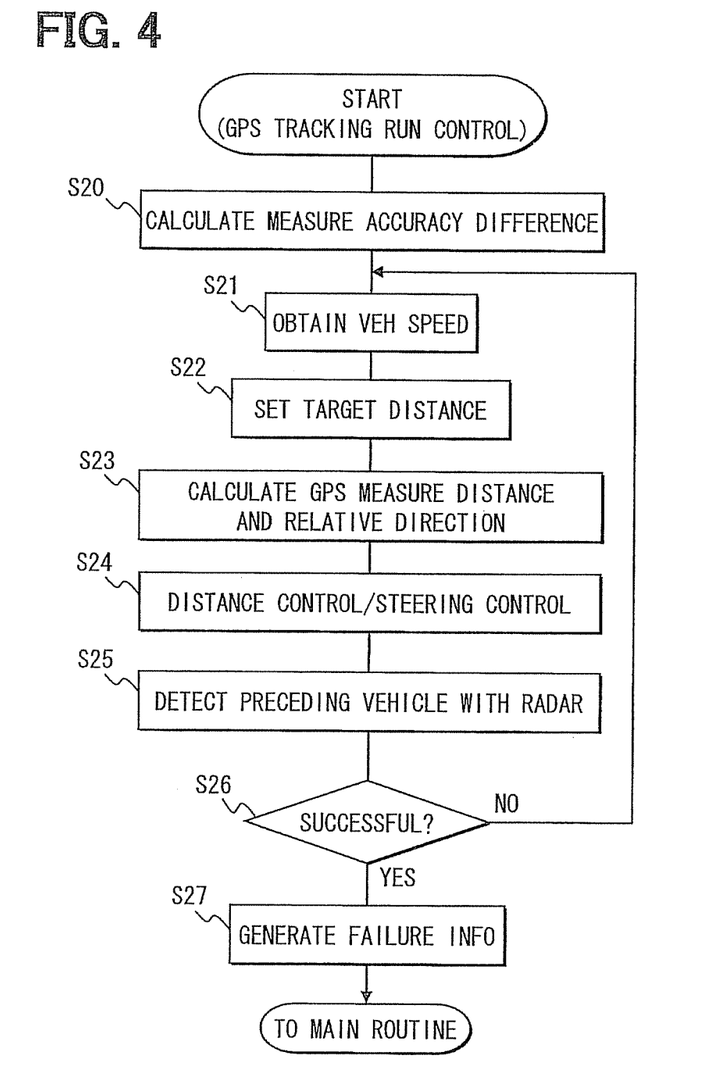
FIG. 4 is a flowchart showing GPS tracking running control performed when the determination in FIG. 3 is negative.

Next, the GPS tracking running control performed when the determination at S12 is negative will be described using FIG. 4. In FIG. 4, first, at S20, a measurement accuracy difference is calculated between the distance measured with the laser radar 20 and a distance calculated from the current position of the subject vehicle to the current position of the preceding vehicle. Note that as the latter distance, the distance between the current positions of the subject vehicle and the preceding vehicle is detected with the position detection unit 30 including a GPS reception unit, the latter distance will be referred to as a "GPS measurement distance." The distance measured with the laser radar 20 will be referred to as a "radar measurement distance." Further, the measurement accuracy difference here is a measurement accuracy difference on the lower measurement accuracy side (GPS measurement distance) with the higher measurement accuracy side (radar measurement distance) as a reference. Since the measurement accuracy of the laser radar 20 is higher, this measurement accuracy difference can also be regarded as the accuracy of the GPS distance measurement.

More particularly, the calculation of the measurement accuracy difference is made by calculating the GPS measurement distance using respectively latest information. Although when the measurement with the laser radar 20 has failed, the process proceeds to FIG. 4, the measurement with the laser radar 20 is, however, repeatedly performed at short periods. Accordingly, when radar measurement distance immediately before the determination of failure is used, there is almost no measurement time difference from the latest GPS measurement distance.

Next, at S21, the vehicle speed is obtained. Next, at S22, the target inter-vehicle distance is set based on the measurement accuracy difference calculated at S20 and the vehicle speed obtained at S21. The target inter-vehicle distance is set using previously-stored relation that the target inter-vehicle distance is prolonged in accordance with increment in the vehicle speed and is prolonged in accordance with increment in the measurement accuracy difference.

Next, at S23, the latest current position of the subject vehicle is obtained from the position detection unit 30 and the latest current position of the preceding vehicle received with the radio communication unit 11 is obtained, and a GPS measurement distance is calculated. Further, at S23, the relative direction of the preceding vehicle is calculated from the current position of the subject vehicle and the current position of the preceding vehicle.

At S24, using the result of calculation at S23 and the target inter-vehicle distance set at S22, instructions are outputted to the brake ECU 40, the engine ECU 50, and the EPS ECU 60 so as to perform tracking with the target inter-vehicle distance with respect to the preceding vehicle.

At S25, the detection of the preceding vehicle with the laser radar 20 is performed. Then at S26, it is determined whether or not the detection has been successful. When the determination is negative, the process returns to S21, to continue the tracking running control using the GPS measurement distance.

On the other hand, when the determination at S26 is affirmative, the process proceeds to S27 corresponding to a failure information generation section, device, or means, to generate failure information. As described above, the failure information includes information to specify a distance measurement device which has failed in measurement of a distance to a preceding vehicle and failure point information to determine a failure point at which the distance measurement has failed. At this S27, the former information indicates the laser radar 20. In the present embodiment, as the latter information, information indicating a start point to an end point of the failed distance measurement, i.e., failure segment information is generated. The end point of the failure segment information is the point upon affirmative determination at S26. On the other hand, the start point is the point upon start of the GPS tracking running control in FIG. 4. Upon start of the GPS tracking control, the current position at that time is stored for the generation of the failure segment information at S27. Note that the generation of the failure information is not limited to the above example. It may be arranged such that the failure information is generated upon every failure in distance measurement with the laser radar 20.

The failure information generated at S27 is broadcast-transmitted from the radio communication unit 11 at the above-described S4 in FIG. 2. After the execution of S27, the process returns to the main routine in FIG. 3.

Figure 5:
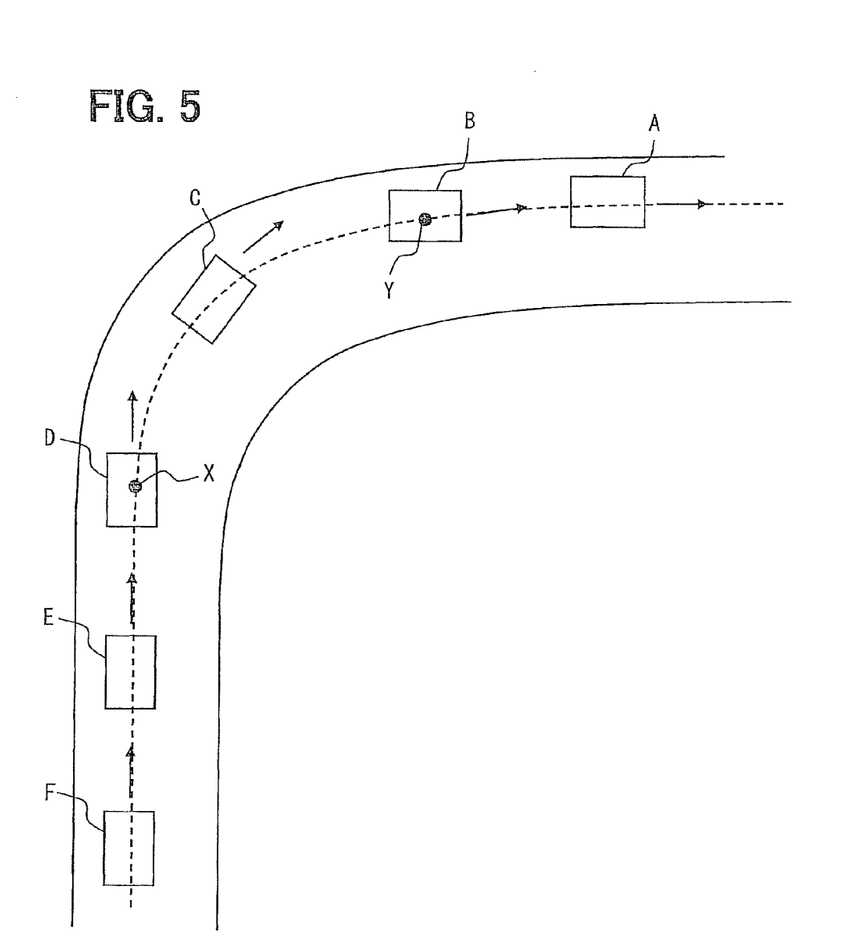
FIG. 5 illustrates an example of transmission timing of failure information generated in accordance with FIG. 4.

FIG. 5 illustrates an example of transmission timing of the failure information generated in accordance with FIG. 4. In FIG. 5, alphabets A to F denote vehicles forming a vehicles convoy; a point X, a point of failure of distance measurement with the laser radar 20 (point at which the determination at S12 in FIG. 3 is negative); and a point Y, a point of success of the distance measurement with the laser radar 20 (point at which the determination at S26 in FIG. 4 is affirmative). In the example of FIG. 5, failure segment information indicating that the failure segment is the point X to the point Y and the failure information indicating that the device failed in the distance measurement is the laser radar 20 are broadcast-transmitted at the point Y. By the transmission, the vehicle E and the vehicle F receive the failure information before they arrive at the point X.

The vehicle E and the vehicle F that have received the failure information respectively perform S16 to S19 in FIG. 3. When it is predicted that the measurement of distance to a preceding vehicle with the laser radar 20 will also fail, the vehicle E and the vehicle F perform the target inter-vehicle distance gradual change control at S300.

Figure 6:
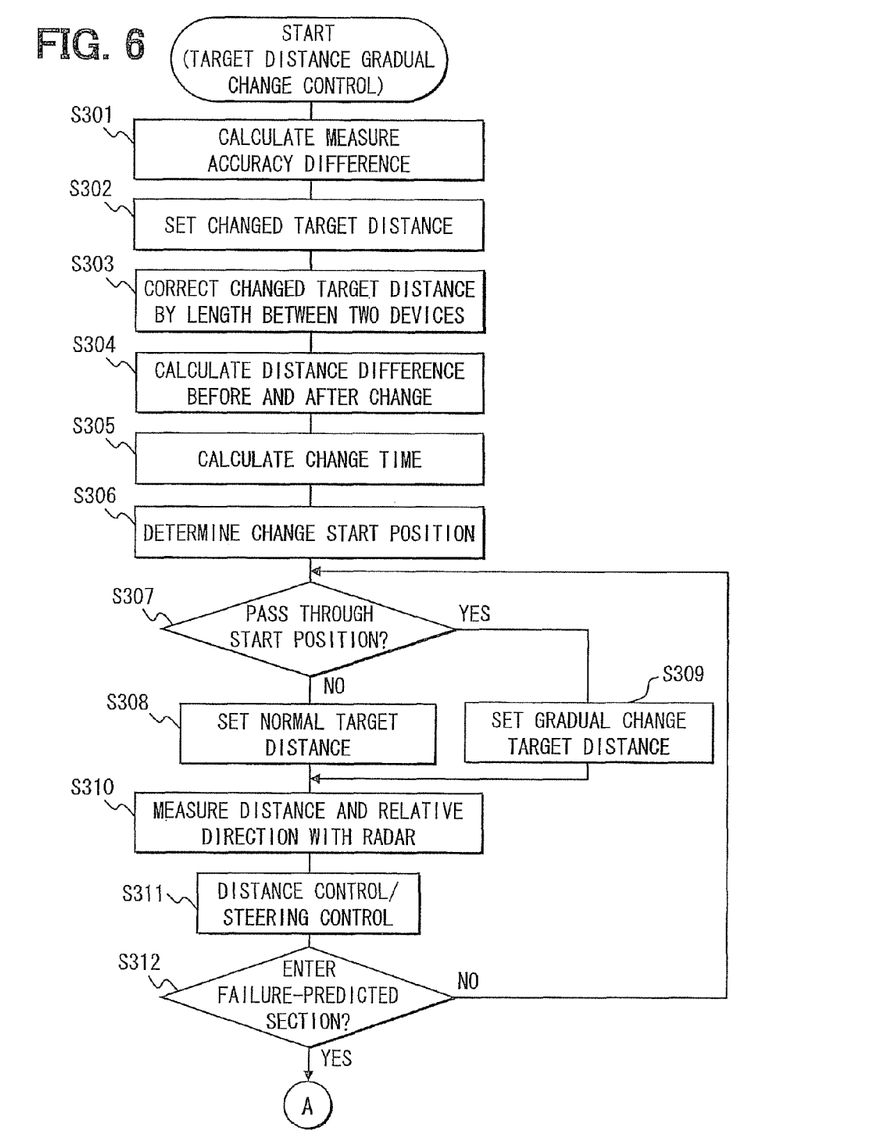
FIG. 6 is a flowchart showing target inter-vehicle distance gradual change control in FIG. 3 in detail.
Figure 7:
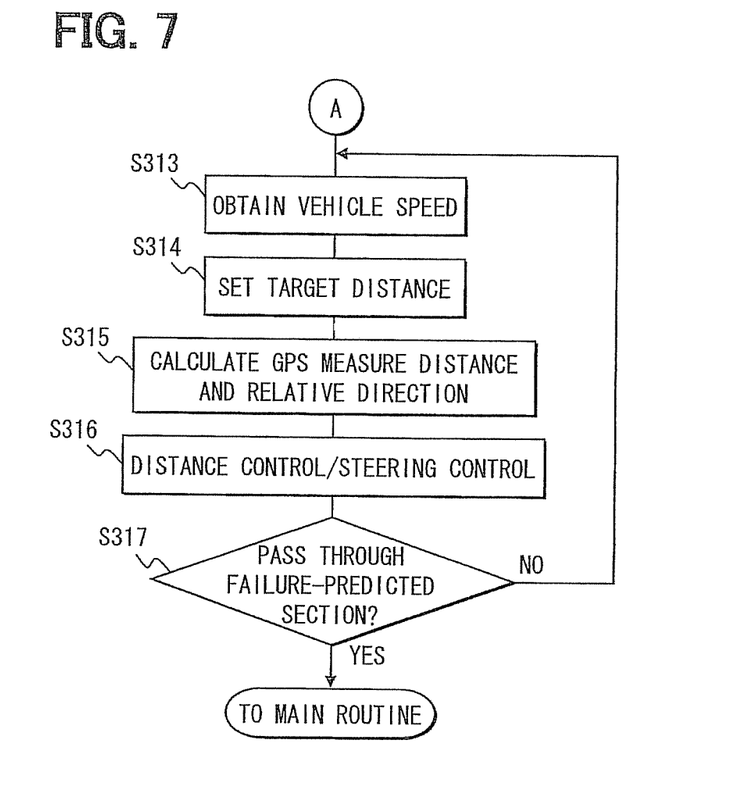
FIG. 7 is a flowchart, showing the target inter-vehicle distance gradual change control in FIG. 3 in detail, performed after the control in FIG. 6.

Next, the target inter-vehicle distance gradual change control at S300 in FIG. 3 will be described. FIGS. 6 and 7 are flowcharts showing the target inter-vehicle distance gradual change control in detail. Note that the target inter-vehicle distance gradual change control corresponds to a target inter-vehicle distance change section, device, or means.

First, at S301, the measurement accuracy difference is calculated. The processing at S301 is the same as that at S20 in FIG. 4. The measurement accuracy difference is calculated between the distance measured with the laser radar 20 (radar measurement distance), and the distance calculated from a distance between the current position of the subject vehicle and the current position of a preceding vehicle (GPS measurement distance). Note that this S301 corresponds to a measurement accuracy difference calculation section, device, or means.

Next, at S302, a changed target inter-vehicle distance is determined. The changed target inter-vehicle distance, immediately after the change of target inter-vehicle distance from the radar measurement distance to the GPS measurement distance, is used in the tracking running control. As in the case of the above-described S22, the changed target inter-vehicle distance is set from the latest vehicle speed at this time and the measurement accuracy difference calculated at S301. Note that when it is possible to predict the vehicle speed upon change to the GPS measurement distance from information from the preceding vehicle in the vehicles convoy (running plan or the like), the predicted vehicle speed may be used in place of the latest vehicle speed.

As described above, the changed target inter-vehicle distance set at S302 is a target inter-vehicle distance immediately after the change of target inter-vehicle distance to the GPS measurement distance, and is a target inter-vehicle distance with respect to the GPS measurement distance. In the target inter-vehicle distance gradual change control in FIG. 6, the target inter-vehicle distance is gradually changed to the above-described changed target inter-vehicle distance. While the target inter-vehicle distance is gradually changed, the distance is measured using the distance measurement device before the change of target inter-vehicle distance, i.e., the laser radar 20. When comparisons are made between the GPS measurement distance and the radar measurement distance, in addition to the difference in the measurement accuracy, there is a difference in position in vehicle as an origin point of the distance measurement. More particularly, the radar measurement distance is a distance from the front end of a subject vehicle to the rear end of its preceding vehicle, while the GPS measurement distance is a distance between the GPS reception units provided at the central positions of both vehicles. Then at S303, the changed target inter-vehicle distance set at S302 is corrected using a length between the position in the vehicle (vehicle central position) as an origin point of distance measurement in the GPS measurement distance and the position in the vehicle (vehicle front end, vehicle rear end) as an origin point of distance measurement in the radar measurement distance. Hereinbelow, as the corrected value is the final target value in the distance control using the laser radar 20, the value will be referred to as a "final target inter-vehicle distance."

Next, at S304, a distance difference between the final target inter-vehicle distance and the current target inter-vehicle distance is calculated. Next at S305, time required for changing the target inter-vehicle distance (distance change time) by the distance difference calculated at the above-described S304, within an acceleration/deceleration range set as a range not to annoy the driver or occupant(s), is calculated.

Figure 8A:
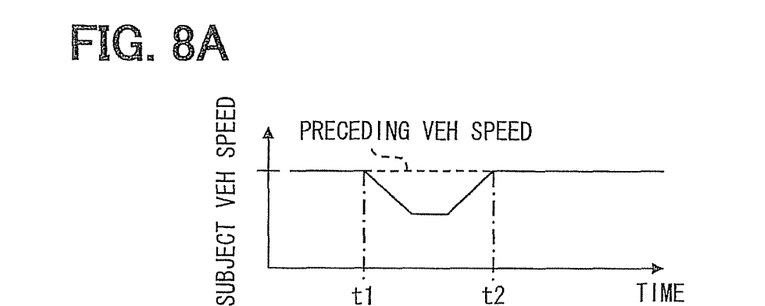
FIG. 8A is a graph showing an example of time change of speed in an embodiment.

FIG. 8A is a graph showing an example for explanation of the distance change time calculated at S305. In FIG. 8A, the lateral axis indicates time, while the vertical axis, vehicle speed. Further, a broken line indicates the speed of a preceding vehicle. In this example, the speed of the preceding vehicle is constant. On the other hand, the speed of the subject vehicle is equal to that of the preceding vehicle to the time point t1, however, it is decelerated from the time point t1, then again becomes the speed of the preceding vehicle at the time point t2. The area surrounded by solid and broken lines between the time points t1 and t2 corresponds to a distance difference caused by the deceleration. Accordingly, the speed of the subject vehicle is controlled such that the area corresponds to the distance difference calculated at S304. Further, the period between the time points t1 to t2 is the distance change time indicating the acceleration/deceleration with the slope of the speed of the subject vehicle.

Returning to FIG. 6, at S306, a distance change start position is determined on a future traveling route of the subject vehicle determined based on the running locus of the preceding vehicle in the vehicles convoy or a running plan transmitted from the preceding vehicle. The distance change start position is a position predicted to be ahead of the time point of the start position of the failure-predicted segment by the distance change time calculated at S305. The distance change start position is calculated from the start position of the failure-predicted segment, the distance change time and a current vehicle speed.

Next, at S307, it is determined whether or not the current position of the subject vehicle has passed through the distance change start position determined at S306. When the determination is negative, then at S308, the normal target inter-vehicle distance is set. The processing at S308 is the same as that at S14 in FIG. 3 except the processing to obtain the vehicle speed is added.

Figure 8B:
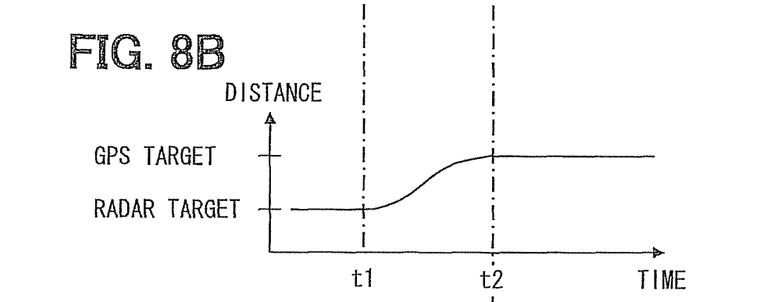
FIG. 8B is a graph showing an example of time-based change of target inter-vehicle distance corresponding to FIG. 8A.

On the other hand, when the determination at S307 is affirmative, the process proceeds to S309, at which a gradual change target inter-vehicle distance is set. FIG. 8B shows an example of the gradual change target inter-vehicle distance. In FIG. 8B, the distance between the time points t1 and t2 is the gradual change target inter-vehicle distance which is calculated from the time change of the speed of subject vehicle shown in the graph of FIG. 8A.

After the execution of S308 or S309, the process proceeds to S310, at which the distance to the preceding vehicle and the relative direction of the preceding vehicle with respect to the subject vehicle are measured using the laser radar 20. Next, at S311, using the result of measurement at S310 and the target inter-vehicle distance set at S308 or S309, instructions are outputted to the brake ECU 40, the engine ECU 50 and the EPS ECU 60 so as to perform tracking with the target inter-vehicle distance with respect to the preceding vehicle.

Next, at S312, it is determined whether or not the current position of the subject vehicle has entered the failure-predicted segment. When the determination is negative, the process returns to S307. On the other hand, when the determination is affirmative, the process proceeds to S313 shown in FIG. 7. These S313 to S316 are the same as S21 to S24 in the GPS tracking control in FIG. 4. Since the failure of the distance measurement with the laser radar 20 is predicted, the measurement distance is changed to the GPS measurement distance and the distance control and the steering control are performed.

Figure 8C:
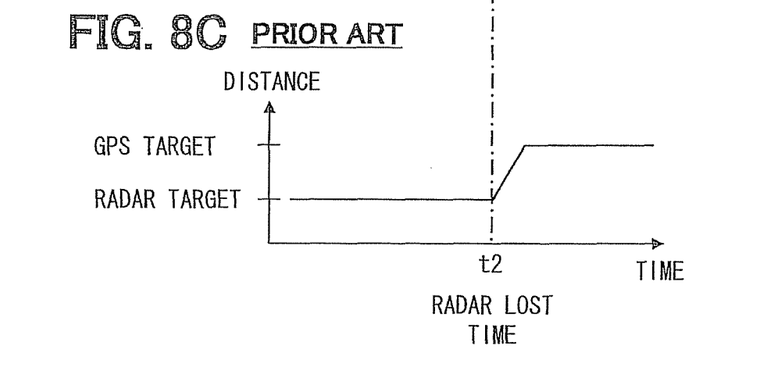
FIG. 8C is a graph according to a conventional technique as a comparative example with respect to FIG. 8B.

Note that in the present embodiment, as shown in FIG. 8B, at a time point to change the distance measurement device to that using the GPS measurement position (i.e., at the time point t2 where the measurement with the laser radar 20 fails), the target inter-vehicle distance is the GPS-utilized target inter-vehicle distance (i.e., the above-described changed target inter-vehicle distance). On the other hand, FIG. 8C shows a conventional technique for a comparison with FIG. 8B. After the change to the GPS measurement distance, the target inter-vehicle distance is changed to the GPS-utilized target inter-vehicle distance. In this case, although not illustrated, a comparatively large speed change occurs since it is necessary to change the target inter-vehicle distance in short time. On the other hand, in the present embodiment, at a time point to change the distance measurement device, the target inter-vehicle distance has been already changed to the GPS-utilized target inter-vehicle distance, and no speed change due to the change of the distance measurement device occurs.

At S317, it is determined whether or not the current position of the subject vehicle has passed through the failure-predicted segment. When the determination at S317 is negative, the process returns to S313, to continue the distance control and the steering control using the GPS measurement distance. On the other hand, when the determination at S317 is affirmative, the process returns to the main routine in FIG. 3.

According to the above-described present embodiment, in a case where the failure-predicted segment in which the distance measurement with the laser radar 20 will fail is determined, upon arrival of the subject vehicle at the failure-predicted segment, the distance measurement device to be used in the tracking running control is changed from the distance measurement device using the laser radar 20 to the distance measurement device using the GPS reception unit. Accordingly, even when the subject vehicle enters the failure-predicted segment, it is possible to suppress the inconvenience that the tracking running with respect to a preceding vehicle becomes impossible due to failure of measurement of the distance to the preceding vehicle.

Further, the change of the distance measurement device is performed after the change of the target inter-vehicle distance to the target inter-vehicle distance corresponding to the changed distance measurement device. Further, the target inter-vehicle distance in the tracking running is gradually changed to the target inter-vehicle distance corresponding to the changed distance measurement device at a previously-set accelerated speed or lower speed (i.e., at an acceleration equal to or greater than a predetermined value). Accordingly, it is possible to suppress annoyance for the occupant(s) by change of target inter-vehicle distance accompanying the change of the distance measurement device.

Further, in the present embodiment, as the distance used in the tracking running control, the changed target inter-vehicle distance which is a target inter-vehicle distance immediately after the change to the GPS measurement distance is determined based on the accuracy of measurement of the GPS measurement distance (S302). However, the changed target inter-vehicle distance is not directly used as a final target inter-vehicle distance for the distance control with the laser radar 20. The changed target inter-vehicle distance is corrected using a length between the position in the vehicle as an origin point (i.e., an installed position) of the distance measurement of the GPS measurement and the position in the vehicle as an origin point (i.e., an installed position) of the distance measurement of the radar measurement, and determined as an target inter-vehicle distance final value in the distance control using the laser radar 20 (final target inter-vehicle distance) (S303). Accordingly, upon change to the GPS measurement distance, it is possible to reduce the difference between the GPS measurement distance and the target inter-vehicle distance.

Further, in the present embodiment, the measurement accuracy difference is calculated from the results of actual distance measurement (S301), and based on the measurement accuracy difference, the changed target inter-vehicle distance is set (S302). The measurement accuracy of the GPS measurement distance and the measurement accuracy of the radar measurement distance may vary in accordance with running environment or the like. Especially, as the measurement accuracy of current position using the GPS reception unit varies in accordance with environment, the measurement accuracy of the GPS measurement distance using this current position may vary in accordance with environment. However, in the present embodiment, the changed target inter-vehicle distance is set based on the measurement accuracy difference calculated from the results of actual distance measurement. Accordingly, it is possible to set the changed target inter-vehicle distance to an appropriate target inter-vehicle distance corresponding to the distance measurement accuracy difference at that time.

Further, in the present embodiment, it is determined to or not to determine the failure-predicted segment based on the percentage of failure in distance measurement in the preceding vehicles rather than the subject vehicle in the vehicles convoy. Accordingly, it is possible to suppress determination of a segment with sufficiently low probability of failure in the distance measurement in the subject vehicle as a failure-predicted segment.

Further, according to the present embodiment, when it is determined that the subject vehicle has passed through the failure-predicted segment (YES at S317), the laser radar 20 is restored (is used again) as the distance measurement device. Accordingly, when it is determined that distance measurement with the laser radar 20 is possible, then immediately the distance is obtained with high accuracy using the laser radar 20.

As described above, the embodiment of the present disclosure has been described, further, the present disclosure is not limited to the above-described embodiment. The following embodiments are also included in the technical range of the present disclosure. Further, other various changes than the following embodiments can be made without departing from the subject matter of the disclosure.

For example, in the above-described embodiment, the failure-predicted segment and the failure-predicted device information are determined only with regard to the distance measurement with the laser radar 20. However, the determination of the failure-predicted segment and the failure-predicted device information may also be performed with regard to the distance measurement with the GPS reception unit. Then, it may be arranged such that, upon change from the GPS measurement distance to the radar measurement distance, the distance is gradually changed before the change.

Further, in the above-described embodiment, when it is determined that the subject vehicle has passed through the failure-predicted segment (YES S317), the laser radar 20 is restored as the distance measurement device, however, the present disclosure is not limited to this arrangement. It may be arranged such that even when the subject vehicle has passed through the failure-predicted segment, in a case where the next failure-predicted segment is predicted and the time to arrive at the next failure-predicted segment is shorter than previously-set time, the laser radar 20 is not restored even when the subject vehicle has passed through the first failure-predicted segment. Note that the time to arrive at the next failure-predicted segment is calculated from the vehicle speed upon passage of the failure-predicted segment and the distance to the next failure-predicted segment. Further, when the distance to the next failure-predicted segment is extremely short, it may be determined that the subject vehicle will soon arrive at the next failure-predicted segment without calculation of the time to arrive at the next failure-predicted segment using the vehicle speed. Accordingly, the determination as to whether or not the time to arrive at the next failure-predicted segment is shorter than the previously-set time may be performed using only the distance to the next failure-predicted segment without vehicle speed.

Further, in the above-described embodiment, the two types of distance measurement device are provided. However, three or more distance measurement device having mutually-different measurement types may be provided. Further, in the above-described embodiment, the measurement accuracy difference is calculated, however, the measurement accuracy difference may be a previously-set constant value.

Further, in the above-described embodiment, the distance measurement device is changed at the time point of arrival at the failure-predicted segment. However, the distance measurement device may be changed before arrival at the failure-predicted segment.

Further, in the above-described embodiment, the failure information is received only from another vehicle in the vehicles convoy (in the same traffic lane). However, the failure information may be received from an oncoming vehicle (in the opposite traffic lane). Further, the failure information may be received from a vehicle which traveled on the road that the vehicles convoy is currently running before the current running of the vehicles convoy. In these arrangements, the vehicle that transmits the failure information periodically transmits the failure information, or transmits the failure information periodically only when the vehicle is positioned around the failure position information included in the failure information. Further, it may be arranged such that a situation of crossing or encountering the vehicles convoy is determined by inter-vehicle communication, and in such situation, the failure information is transmitted.

Further, in the above-described embodiment, the failure segment information indicates a segment from the failure of distance measurement to the success of the distance measurement; however, the present disclosure is not limited to this arrangement. The failure segment information may indicate a segment in which the distance measurement intermittently fails.

Further, in the above-described embodiment, the failure information includes information to specify the distance measurement device which failed measurement of the distance to the preceding vehicle. However, as in the case of the above-described embodiment, when two types of distance measurement device, i.e., a device using a radar and a device using a GPS reception unit are provided, the device using the radar has a higher distance measurement accuracy. Accordingly, it is conceivable that the distance measurement is performed using the radar at normal times. In this case, since information of failure in the distance measurement using the radar is significant, another vehicle may transmit the failure information only when the distance measurement using the radar has failed. Further, as the failure information is transmitted only when the distance measurement using the radar has failed, it is not necessary to include the information to specify the distance measurement device that failed the measurement of distance to the preceding vehicle in the failure information.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A tracking running control apparatus in a vehicle having a plurality of distance measurement devices using mutually different modes, respectively, to sequentially measure an inter-vehicle distance that is a distance to a preceding vehicle, the tracking running control apparatus performing a tracking running control with respect to the preceding vehicle so as to set the inter-vehicle distance to a target inter-vehicle distance that is associated with each of the distance measurement devices, the tracking running control comprising:

a radio receiver to receive failure information of a different vehicle that is different from the vehicle via an outside source outside of the vehicle, the failure information of the different vehicle containing (i) failure device information to specify a distance measurement device that underwent a measurement failure in a measurement of an inter-vehicle distance and (ii) failure point information to determine a failure point at which the measurement failure was undergone;

a failure prediction section to obtain (i) failure-predicted device information indicating a failure-predicted distance measurement device that is predicted to undergo a measurement failure in a measurement of an inter-vehicle distance and (ii) a failure-predicted segment in which the measurement failure is predicted, based on the failure information of the different vehicle received by the radio receiver;

a target inter-vehicle distance change section to, in cases that a used distance measurement device that is used in the tracking running control of the vehicle is the failure-predicted distance measurement device indicated by the failure-predicted device information, determine to change the used distance measurement device from the failure-predicted distance measurement device indicated by the failure-predicted device information to a different distance measurement device other than the failure-predicted distance measurement device, and change gradually the target inter-vehicle distance set in the tracking running control to a changed target inter-vehicle distance that is associated with the different distance measurement device at an acceleration equal to or less than a predetermined value before the vehicle reaches the failure-predicted segment; and a distance measurement device change section to, when an inter-vehicle distance to a preceding vehicle becomes the changed target inter-vehicle distance, change the used distance measurement device from the failure-predicted distance measurement device to the different distance measurement device.

2. The tracking running control apparatus according to claim 1, wherein:

the target inter-vehicle distance change section determines the changed target inter-vehicle distance based on a measurement accuracy with respect to each of the failure-predicted distance measurement device and the different distance measurement device by correcting the target inter-vehicle distance based on a length between (i) a position in the vehicle as an origin point of measurement by the failure-predicted distance measurement device and (ii) a position in the vehicle as an origin point of measurement by the different distance measurement device.

3. The tracking running control apparatus according to claim 1, further comprising:
a measurement accuracy difference calculation section to calculate a measurement accuracy difference between the distance measurement devices, based on results of sequentially measuring the inter-vehicle distances by the distance measurement devices, respectively,
wherein:
the target inter-vehicle distance change section sets the changed target inter-vehicle distance based on the measurement accuracy difference calculated by the measurement accuracy distance calculation section.

4. The tracking running control apparatus according to claim 3, wherein:
the target inter-vehicle distance change section further corrects the changed target inter-vehicle distance, which was set based on the measurement accuracy difference, based on a length between (i) a position in the vehicle as an origin point of measurement by the failure-predicted distance measurement device and (ii) a position in the vehicle as an origin point of measurement by the different distance measurement device, finally determining the changed target inter-vehicle distance as a final target inter-vehicle distance.

5. The tracking running control apparatus according to claim 1, further comprising:
an order determination information generation section to sequentially generate order determination information relative to the vehicle, the order determination information relative to the vehicle indicating an order of the vehicle in a vehicles convoy;
a radio transmitter to sequentially transmit the order determination information relative to the vehicle generated by the order determination information generation section to an outside source outside of the vehicle, wherein the radio receiver receives order determination information relative to a different vehicle transmitted from the different vehicle in the vehicles convoy;
an order-in-convoy determination section to sequentially determine an order of the vehicle from a head in the vehicles convoy based on (i) the order determination information relative to the different vehicle received by the radio receiver and (ii) the order determination information relative to the vehicle generated by the order determination information generation section; and
an information transmitting vehicle determination section to determine whether or not the failure information received by the radio receiver is transmitted from a vehicle ahead of the vehicle in the vehicles convoy,
wherein:
the failure prediction section
determines a percentage of a number of preceding vehicles transmitting failure information to a number of preceding vehicles, based on the order of the vehicle in the vehicles convoy determined by the order-in-convoy determination section and a result of determining by the information transmitting vehicle determination section,
the preceding vehicles being vehicles that are ahead of the vehicle in the vehicles convoy,
the preceding vehicles transmitting failure information being, within the preceding vehicles, vehicles, from each of which the failure information is received by the radio receiver, and
determines the failure-predicted segment using the percentage.

6. The tracking running control apparatus according to claim 1, wherein:
the distance measurement device change section changes again the used distance measurement device from the different distance measurement device to the failure-predicted distance measurement device when the vehicle passes through the failure-predicted segment.

7. The tracking running control apparatus according to claim 6, wherein:
the distance measurement device change section does not change again the used distance measurement device from the different distance measurement device to the failure-predicted distance measurement device even when the vehicle passes through the failure-predicted segment,
in cases that
(i) the failure prediction section predicts a next failure-predicted segment, and
(ii) it is determined that a time period before arrival at the next failure-predicted segment is shorter than a predetermined value.

8. The tracking running control apparatus according to claim 1, further comprising:
a measurement failure determination section to sequentially determine whether or not a measurement by the distance measurement device undergoes a failure;
a failure information generation section to generate failure information indicating a position of the vehicle and a result of determining by the distance measurement device when the measurement by the distance measurement device is determined to having undergone a failure; and
a radio transmitter to broadcast-transmit the failure information generated by the failure information generation section to an outside source outside of the vehicle.

9. The tracking running control apparatus according to claim 1, wherein
the plurality of distance measurement devices includes:
a first distance measurement device to measure an inter-vehicle distance from a time period between transmission of a transmission radio wave and reception of a reflection wave of the transmission radio wave; and
a second distance measurement device to measure an inter-vehicle distance from a distance between a position of the vehicle and a position of a preceding vehicle detected with a global positioning system.

10. A tracking running control apparatus in a vehicle having a first distance measurement device and a second distance measurement device to sequentially measure an inter-vehicle distance that is a distance to a preceding vehicle,
the tracking running control apparatus performing a tracking running control with respect to the preceding vehicle so as to set the inter-vehicle distance to a target inter-vehicle distance that is associated with each of the first distance measurement device and the second distance measurement device,
the first distance measurement device to measure the inter-vehicle distance from a time period between transmission of a transmission radio wave and reception of a reflection wave of the transmission radio wave, the second distance measurement device to measure the inter-vehicle distance from a distance between a position of the vehicle and a position of the preceding vehicle detected with a global positioning system, the tracking running control apparatus comprising:

a radio receiver to receive failure information of a different vehicle that is different from the vehicle via an outside source outside of the vehicle, the failure information of the different vehicle containing failure point information to determine a failure point at which a measurement failure in a measurement of an inter-vehicle distance was undergone;

a failure prediction section to determine a failure-predicted segment in which the failure of the distance measurement is predicted based on the failure information received by the radio receiver;

a failure prediction section to obtain a failure-predicted segment in which a measurement failure in a measurement of an inter-vehicle distance is predicted, based on the failure information of the different vehicle received by the radio receiver;

a target inter-vehicle distance change section to, determine to change a used distance measurement device that is used in the tracking running control of the vehicle to the second distance measurement device in cases that the radio receiver receives the failure information of the different vehicle, and change gradually the target inter-vehicle distance set in the tracking running control to a changed target inter-vehicle distance that is associated with the second distance measurement device at an acceleration equal to or less than a predetermined value before the vehicle reaches the failure-predicted segment; and a distance measurement device change section to change to the second distance measurement device after an inter-vehicle distance to a preceding vehicle becomes the changed target inter-vehicle distance.

* * * * *